(12) United States Patent
Fu et al.

(10) Patent No.: US 11,458,544 B2
(45) Date of Patent: Oct. 4, 2022

(54) ROTATABLE ASSEMBLIES, MACHINING BAR ASSEMBLIES AND METHODS THEREFOR

(71) Applicant: MAQ AB, Solna (SE)

(72) Inventors: Qilin Fu, Solna (SE); Cornel-Mihai Nicolescu, Knivsta (SE); Amir Rashid, Upplands Väsby (SE)

(73) Assignee: MAQ AB, Solna (SE)

( * ) Notice: Subject to any disclaimer, the term of this patent is extended or adjusted under 35 U.S.C. 154(b) by 844 days.

(21) Appl. No.: 16/328,513

(22) PCT Filed: Aug. 31, 2016

(86) PCT No.: PCT/SE2016/050820
§ 371 (c)(1),
(2) Date: Feb. 26, 2019

(87) PCT Pub. No.: WO2018/044216
PCT Pub. Date: Mar. 8, 2018

(65) Prior Publication Data
US 2021/0291277 A1    Sep. 23, 2021

(51) Int. Cl.
*B23B 29/12* (2006.01)
*B23B 27/00* (2006.01)
*B23C 5/00* (2006.01)

(52) U.S. Cl.
CPC ............ *B23B 27/002* (2013.01); *B23C 5/003* (2013.01); *B23B 2226/33* (2013.01);
(Continued)

(58) Field of Classification Search
CPC . B23B 27/002; B23B 29/022; B23B 2250/16; B23B 2251/70; B23B 2260/136;
(Continued)

(56) References Cited

U.S. PATENT DOCUMENTS 3,447,402 A    6/1969  Ray
3,559,512 A *  2/1971  Aggarwal ................ F16F 7/10
                                              408/143
(Continued)

FOREIGN PATENT DOCUMENTS

DE    102013101854 A1    8/2014
EP       0094557 A1 *  11/1983    ........... B23B 29/022
(Continued)

OTHER PUBLICATIONS

3M: 3M Viscoelastic Damping Polymer 112 Series, May 31, 2017 (May 31, 2017), XP002786492, Retrieved from the Internet on Nov. 12, 2018, 8 pages.
(Continued)

*Primary Examiner* — Boyer D Ashley
*Assistant Examiner* — Stephen Sun Cha
(74) *Attorney, Agent, or Firm* — RMCK Law Group, PLC (57) ABSTRACT

Rotatable assembly (10) having one end (12) adapted to be secured to a rotatable support for rotating the rotatable assembly (10) about a rotational axis (28), the rotatable assembly (10) comprising: a main body (18) having a cavity (56); a damping mass (38) arranged within the cavity (56) and movable in radial directions (30), substantially perpendicular to the rotational axis (28), relative to the main body (18); a damping structure (36) arranged to support the damping mass (38) relative to the main body (18) and arranged to damp vibrational movements of the damping mass (38) relative to the main body (18) in the radial directions (30); wherein the damping structure (36) comprises a plurality of spring elements (40); and wherein each spring element (40) has a flat appearance.

19 Claims, 10 Drawing Sheets

(52) U.S. Cl.
CPC ....... *B23B 2250/16* (2013.01); *B23C 2226/33* (2013.01); *B23C 2250/16* (2013.01)

(58) Field of Classification Search
CPC . B23B 2226/33; B23C 5/003; B23C 2250/16; B23C 2226/33; B23C 2260/84
See application file for complete search history.

(56) References Cited

U.S. PATENT DOCUMENTS

| | | | |
|---|---|---|---|
| 3,598,498 | A | 8/1971 | Holmen |
| 3,643,546 | A | 2/1972 | Richter et al. |
| 5,095,786 | A | 3/1992 | Bellinghausen et al. |
| 5,700,116 | A | 12/1997 | Cobb, Jr. |
| 5,810,528 | A | 9/1998 | O'Connor et al. |
| 8,020,474 | B2 | 9/2011 | Mihic |
| 9,073,129 | B2 * | 7/2015 | Craig ..................... B23B 51/02 |
| 2016/0008892 | A1 | 1/2016 | Haimer |
| 2016/0067787 | A1 | 3/2016 | Giannetti |

FOREIGN PATENT DOCUMENTS

| | | |
|---|---|---|
| FR | 2902680 A1 | 12/2007 |
| WO | 2014007435 A1 | 1/2014 |

OTHER PUBLICATIONS

PCT International Preliminary Report on Patentability dated Sep. 27, 2018 for International Application No. PCT/SE2016/050820, 20 pages.

PCT International Search Report and Written Opinion dated Aug. 31, 2017 for International Application No. PCT/SE2016/050820, 15 pages.

PCT International Search Report and Written Opinion dated Nov. 26, 2018 for International Application No. PCT/SE2018/050192, 17 pages.

Japanese Office Action dated Apr. 28, 2020 for JP Application No. 2019-532914 with attached English translation, 6 pages.

* cited by examiner

ROTATABLE ASSEMBLIES, MACHINING BAR ASSEMBLIES AND METHODS THEREFOR

CROSS-REFERENCE TO RELATED APPLICATIONS

This application is a 371 U.S. National Stage of International Application No. PCT/SE2016/050820, filed Aug. 31, 2016. The disclosure of the above application is incorporated herein by reference in its entirety.

TECHNICAL FIELD

The present disclosure generally relates to rotatable assemblies, machining bar assemblies and methods therefor. In particular, a rotatable assembly comprising a damping mass supported by a damping structure within a cavity of a main body, a rotatable assembly comprising a damping mass within a cavity of a main body and a coolant supply structure, and a machining bar assembly comprising a machining bar body, a tool head and a damping structure between the tool head and the machining bar body, are provided.

BACKGROUND

Vibrations in mechanical components and structures during rotation thereof might impose adverse effect on their life time and performance. One known solution to suppress vibrations of rotating structures is to provide a tuned mass damper such that the vibration energy of the rotating structure is transmitted to the added mass. Thereby, the added mass vibrates instead of the rotating structure and the rotating structure can be held stable during operation. Machining tools are typical applications that use tuned mass dampers in long overhang tooling structures. Machine tools are usually implemented as cantilever structures and their stiffness substantially decreases with an increased overhang length to diameter ratio.

U.S. Pat. No. 8,020,474 B2 discloses a tool holder for damping vibrations. The tool holder comprises a shaft intended to be arranged in a tool holder in a manufacturing machine, a head on which a cutter is intended to be arranged and a viscoelastic material arranged so that the cutter is in contact with the manufacturing machine solely via the viscoelastic material. The viscoelastic material is attached on a bearer material that is attached to the surface of the shaft.

SUMMARY

One object of the present disclosure is to provide a rotatable assembly having an improved vibrational damping.

A further object of the present disclosure is to provide a rotatable assembly having a reliable vibrational damping over time.

A still further object of the present disclosure is to provide a rotatable assembly having a simple structure to reduce vibrations.

A still further object of the present disclosure is to provide a rotatable assembly having a cheap design.

A still further object of the present disclosure is to provide a rotatable assembly requiring reduced maintenance and/or adjustments, such as tuning.

A still further object of the present disclosure is to provide a rotatable assembly with a simple maintenance and/or adjustment.

A still further object of the present disclosure is to provide a rotatable assembly having a longer life time.

A still further object of the present disclosure is to provide a rotatable assembly that is efficiently damped not only in its first vibration mode, but also in its second and higher vibration modes.

According to one aspect, there is provided a rotatable assembly having one end adapted to be secured to a rotatable support for rotating the rotatable assembly about a rotational axis, the rotatable assembly comprising a main body having a cavity; a damping mass arranged within the cavity and movable in radial directions, substantially perpendicular to the rotational axis, relative to the main body; a damping structure arranged to support the damping mass relative to the main body and arranged to damp vibrational movements of the damping mass relative to the main body in the radial directions; wherein the damping structure comprises a plurality of spring elements; and wherein each spring element has a flat appearance.

The damping structure may be constituted by a stack comprising the spring elements but no damping mass. The damping structure may thus be constituted by a lamellate structure comprising a plurality of spring elements.

The spring elements may be assembled into the stack in vacuum environment, in order to avoid the formation of air bubbles in the joining areas of the spring elements. Furthermore, the spring elements may be arranged substantially concentric with the rotational axis of the rotatable assembly.

Throughout the present disclosure, the damping structure may alternatively be referred to as a stiffness element for the damping mass. The damping structure and the damping mass may be collectively referred to as a tuned mass damper.

According to one variant, the rotatable assembly comprises only one damping mass. The damping mass may be constituted by a single rigid piece of material, for example metal.

The damping mass may be supported by two damping structures relative to the main body, e.g. one on each side of the damping mass along the rotational rotational axis. Each damping mass may be arranged within the cavity of the main body. The damping mass may be supported relative to the main body only by one or more damping structures according to the present disclosure.

The damping mass may be positioned such that its center of mass is located at an antinode region of the second vibration mode or higher. For example, the damping mass may be positioned such that its center of mass is located at the antinode region of the second vibration mode closest to the end of the rotatable assembly adapted to be secured to the rotatable support, i.e. approximately 40% to 50% of the distance from this end to a free end (e.g. a tool head end) along the rotational axis of the rotatable assembly.

A width of each spring element in a radial direction may be at least 30 times, preferably at least 50 times, such as at least 100 times, a thickness of the spring element along the rotational axis. This provides for a particularly flat appearance of each spring element. The thickness of each spring element may be less than 1 mm.

One or more of the plurality of spring elements may have a varying extension in the radial directions. For example, one spring element may extend a first distance from the rotational axis in one or more radial directions and extend a second distance, different from the first distance, from the rotational axis in one or more other radial directions. Each spring element may be either symmetric or asymmetric with respect to a line perpendicular to the rotational axis. In case one or more of the plurality of spring elements have a varying extension in the radial directions and have a similar shape, the spring elements may be arranged at different rotational orientations about the rotational axis in order to provide different stiffnesses in different radial directions of the damping structure. The one or more spring elements having a varying extension in the radial directions may have a varying extension in the radial directions in an unloaded state.

One or more of the plurality of spring elements may have an elliptical, triangular or polygonal appearance, as seen along the rotational axis. Alternatively, or in addition, one or more of the plurality of spring elements may have an irregular circumferential profile with respect to the rotational axis.

According to one variant, one or more of the spring elements has an elliptical shape, as seen along the rotational axis, wherein a length of a minor axis of the elliptical shape is 70% to 90% of a length of a major axis of the elliptical shape.

The damping structure may have different stiffness in different radial directions. Such stiffness differences may be accomplished by varying the extension in radial directions of one or more of the plurality of spring elements. Alternatively, or in addition, such stiffness differences may be accomplished by varying the thickness of one or more of the plurality of spring elements, for example by providing one or more circular spring elements having a circular sector of increased or reduced thickness or a circular sector of a stiffer or a less stiff material.

By providing a damping structure having a different stiffness in different radial directions, also the resonant frequency of the damping mass differs in the different radial directions. The damping structure and the damping mass may in this way be configured such that the varied resonant frequency of the damping mass in different radial directions matches the different vibration frequency of the rotatable assembly in different directions. In other words, this solution may be used for rotatable assemblies that are asymmetric about the rotational axis.

Throughout the present disclosure, each spring element may be constituted by a resilient plate. For example, the spring elements may comprise or be constituted by a viscoelastic material, a rubber, a composite or a polymer.

The spring elements may comprise a material having a frequency dependent elastic modulus. The damping mass and the spring elements may thus be configured such that the resonance frequency of the damping mass matches the frequency of the main body over a frequency range.

Thus, at at least some vibration frequencies of the main body, an increase/decrease of the main body's vibration frequency is compensated by an increased/decreased stiffness in the spring elements due to the frequency dependent elastic modulus. An increased vibration frequency of the rotatable assembly will thereby lead to an increased elastic modulus (or shear modulus) of the spring elements which in turn increases the resonant frequency of the damping mass to match with the increased vibration frequency of the rotatable assembly, and vice versa.

In this manner, the damping structure generates a self-tuning effect, i.e. it changes the resonant frequency of the damping mass automatically without having to change the compression preload on the damping structure. Thus, the damping structure can give a wide range of resonant frequencies of the damping mass.

The 3M® 112' viscoelastic polymers constitute examples of materials having a frequency dependent elastic modulus.

Alternatively, or in addition, the spring elements may comprise a material having a temperature dependent elastic modulus. The elastic modulus of the spring elements may thus be controlled by controlling the temperature of the spring elements in order to adjust the resonant frequency of the damping mass to match with the vibration frequency of the rotatable assembly. This temperature control may be done by controlling a coolant supply to the spring elements, either a dedicated coolant supply or an already existing coolant supply, e.g. a coolant supply to a tool head of a machining bar assembly.

Thus, the present disclosure also provides for a method of controlling the temperature of spring elements having a temperature dependent elastic modulus in order to control the resonant frequency of the damping mass to match with the vibration frequency of the rotatable assembly.

The rotatable assembly may be configured such that at least one spring element can be added to, or removed from, the damping structure in order to decrease or increase, respectively, the stiffness of the damping structure in the radial directions.

The damping structure may comprise a plurality of metal plates, wherein the metal plates and the spring elements are arranged in an alternating manner. The metal plates may be of aluminium or steel.

The rotatable assembly may further comprise at least one auxiliary supporting structure arranged to separate the damping mass and the main body, wherein each auxiliary supporting structure comprises layers of resilient material and layers of metallic material alternatingly arranged along the rotational axis or in the radial directions.

The width of each spring element, along the rotational axis, may be less than 1 mm, such as 0.05 mm to 0.3 mm, such as approximately 0.1 mm.

The width of each metal plate, along the rotational axis, may be approximately twice the width of each spring element, i.e. less than 2 mm, such as 0.1 mm to 0.6 mm, such as approximately 0.2 mm.

The rotatable assembly may further comprise a clamping mechanism arranged to compress and uncompress the damping structure along the rotational axis. The clamping mechanism may be openable in order to add or remove spring elements to or from the damping structure.

The clamping mechanism may comprise a worm drive. The worm drive may comprise a worm screw and a worm wheel. The worm screw may be oriented substantially perpendicular to, and the worm wheel may be substantially concentric with, the rotational axis of the rotatable assembly. The worm screw may thus be screwed by an operator (e.g. by means of a screwdriver) to rotate the worm wheel to compress the damping structure, for example via a compression plate.

The rotatable assembly may further comprise a compression plate between the clamping mechanism and the damping structure. The compression plate may be aligned on, and substantially perpendicular to, the rotational axis such that the load from the clamping mechanism is evenly distributed over a contact area between the clamping mechanism and the compression plate. The compression plate also provides a substantially evenly distributed load onto the damping structure.

The compression plate may comprise a recess or pocket that matches a contour of at least the outer component of the damping structure (e.g. a metal plate) such that this component (and possibly further components of the damping structure) can be received in the recess.

Furthermore, the compression plate may be rotationally locked with respect to the main body, for example by rotationally locking the compression plate relative to the plug member.

The rotatable assembly may further comprise, in addition to the damping mass, at least one additional damping mass, wherein each damping mass has a unique weight.

The rotatable assembly may further comprise, in addition to the damping structure, at least one additional damping structure, wherein the damping masses and the damping structures are alternatingly arranged.

Each additional damping structure may comprise a plurality of spring elements according to the present disclosure, i.e. wherein each spring element has a flat appearance.

According to a further aspect, there is provided a rotatable assembly having one end adapted to be secured to a rotatable support for rotating the rotatable assembly about a rotational axis, the rotatable assembly comprising: a main body having a cavity; a tool head for holding a cutter; a damping mass arranged within the cavity such that a clearance is established between the damping mass and the main body in radial directions, substantially perpendicular to the rotational axis; and a coolant supply structure for supplying coolant to the tool head; wherein the coolant supply structure is partly constituted by the clearance. The coolant may thus both be used to cool a tool head (and/or the spring elements) and serve as a viscous fluid to damp vibrations of the main body and the damping mass.

The rotatable assembly according to the present disclosure may be constituted by a machining bar assembly and the main body according to the present disclosure may be constituted by a machining bar body. However, alternative rotatable assemblies and main bodies are conceivable. For example, the rotatable assembly may be constituted by other machining tool structures (e.g. for boring, milling or grinding) or by mechanical structures not necessarily employed for machining a workpiece.

According to a further aspect, there is provided a machining bar assembly having one end adapted to be secured to a rotatable support for rotating the machining bar assembly about a rotational axis, the machining bar assembly comprising: a machining bar body; a tool head; and a damping structure between the tool head and the machining bar body; wherein the damping structure is positioned at a node region closest to the tool head of the second or higher vibration mode of the machining bar assembly. The machining bar assembly may be constituted by both long overhang tools and short overhang tools.

Throughout the present disclosure, a machining bar assembly may be constituted by a boring bar assembly and a machining bar body may be constituted by a boring bar body.

At a first vibration mode of a cantilever structure, the structure comprises one node (where the structure does not move) at its fixed end and one antinode (where the structure undergoes maximum displacement) at its free end. At a second vibration mode, the structure comprises two nodes and two antinode. At a third vibration mode, the vibrating object comprises three nodes and three antinodes etc.

The strain in the vibrating structure is typically highest at the nodes and the displacement is highest at the antinodes. Furthermore, kinetic energy is concentrated at the antinode regions and potential energy is concentrated at the node regions.

For example, the damping structure may be positioned at a node region closest to the tool head of the second vibration mode, the third vibration mode or a higher vibration node of the machining bar assembly. A node region of the second vibration mode closest to the tool head may be located at approximately 25% of the length of the machining bar assembly along the rotational axis from the tool head. A node region of the third vibration mode closest to the tool head may be located at approximately 20% of the length of the machining bar assembly along the rotational axis from the tool head. A node region of the fourth vibration mode may be located at approximately 14% of the length of the machining bar assembly along the rotational axis from the tool head etc.

Throughout the present disclosure, a substantially perpendicular/parallel relationship includes a perfectly perpendicular/parallel relationship as well as deviations from a perfectly perpendicular/parallel relationship with up to 5%, such as up to 2%. Similarly, a substantially corresponding distance as used herein includes a perfectly corresponding distance as well as deviations from a perfectly corresponding distance with up to 5%, such as up to 2%.

BRIEF DESCRIPTION OF THE DRAWINGS

Further details, advantages and aspects of the present disclosure will become apparent from the following embodiments taken in conjunction with the drawings, wherein:

FIG. 6b: schematically represents a side view of the damping structure in FIG. 6a;

FIG. 8b: schematically represents a front view of the damping mass in FIG. 8a;

FIG. 9b: schematically represents a cross sectional side view of the compression plate and the metal plate in FIG. 9a;

FIG. 14b: schematically represents a cross sectional side view of the assembly in FIG. 14a;

FIG. 15b: schematically represents a cross sectional side view of the assembly in FIG. 15a;

DETAILED DESCRIPTION

In the following, a rotatable assembly comprising a damping mass supported by a damping structure within the cavity of a main body, a rotatable assembly comprising a damping mass within the cavity of a main body and a coolant supply structure, and a machining bar assembly comprising a machining bar body, a tool head and a damping structure between the tool head and the machining bar body, will be described. The same reference numerals will be used to denote the same or similar structural features.

Figure 1:
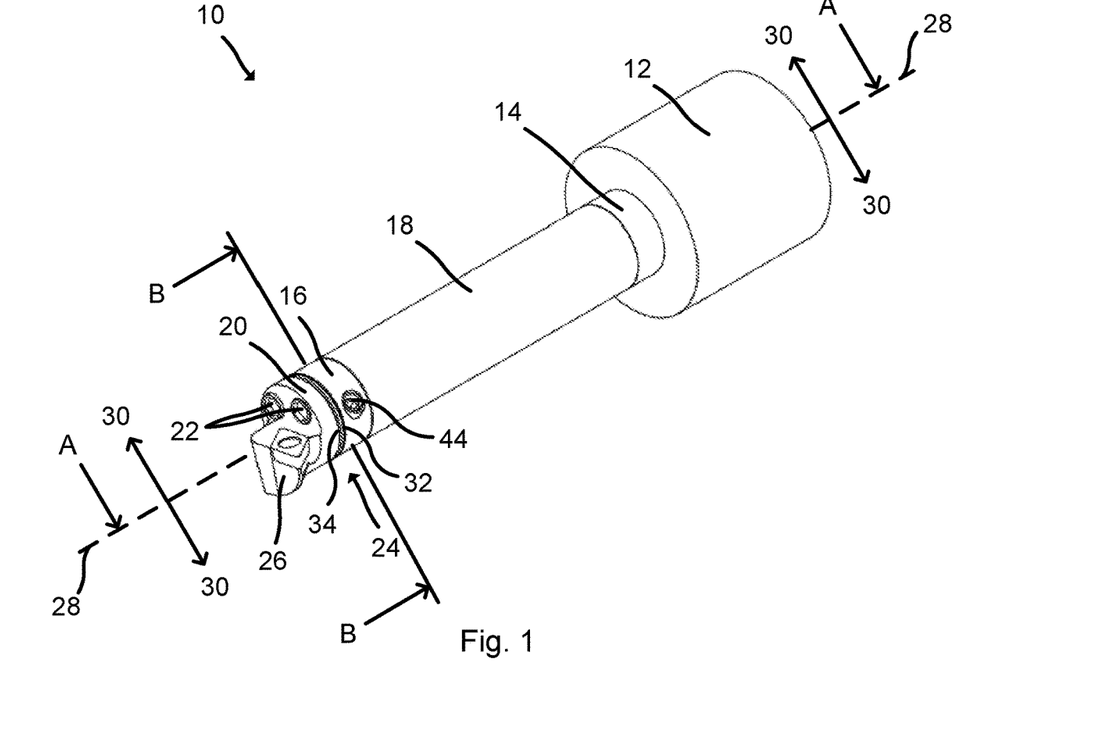
FIG. 1: schematically represents a perspective view of a rotatable assembly in the form of a boring bar assembly.

FIG. 1 schematically represents a perspective view of a rotatable assembly 10. In this example, the rotatable assembly is constituted by a machining bar assembly in the form of a boring bar assembly 10.

The boring bar assembly 10 of this example comprises an end 12 constituted by an end piece 12 for being secured to a rotatable support (not shown). The boring bar assembly 10 further comprises a tail locking part 14, a plug member 16 and a hollow cylindrical main body 18 constituted by a boring bar body. The boring bar body 18 is one type of a machining bar body.

The tail locking part 14 and the plug member 16 are rigidly fixedly to the main body 18, for example by means of screws (not shown). An end portion of the tail locking part 14 is inserted into an opening in the end 12 and the tail locking part 14 is fixedly connected to the end 12 by means of screws or hydraulic expansion clampers.

A tool head 20 is rigidly connected to the plug member 16, in this example by means of three screws 22. The tool head 20 is connected to the plug member 16 via a damping structure 24. The tool head 20 holds a cutter 26 for machining a workpiece (not shown) when rotating the boring bar assembly 10 about its rotational axis 28. Vibration problems in the boring bar assembly 10 might significantly reduce the life time of the cutter 26.

FIG. 1 further denotes radial directions 30 substantially perpendicular to the rotational axis 28. During operation, vibrational movements of the boring bar assembly 10 occurs substantially in the radial directions 30.

The damping structure 24 comprises a spring element 32 and a metal plate 34. In this example, the spring element 32 is of a viscoelastic material. The damping structure 24 is positioned at a node region of the boring bar assembly 10. The damping structure 24 efficiently suppresses vibrations with higher frequency other than the first vibration mode of the boring bar assembly 10.

Figure 2:
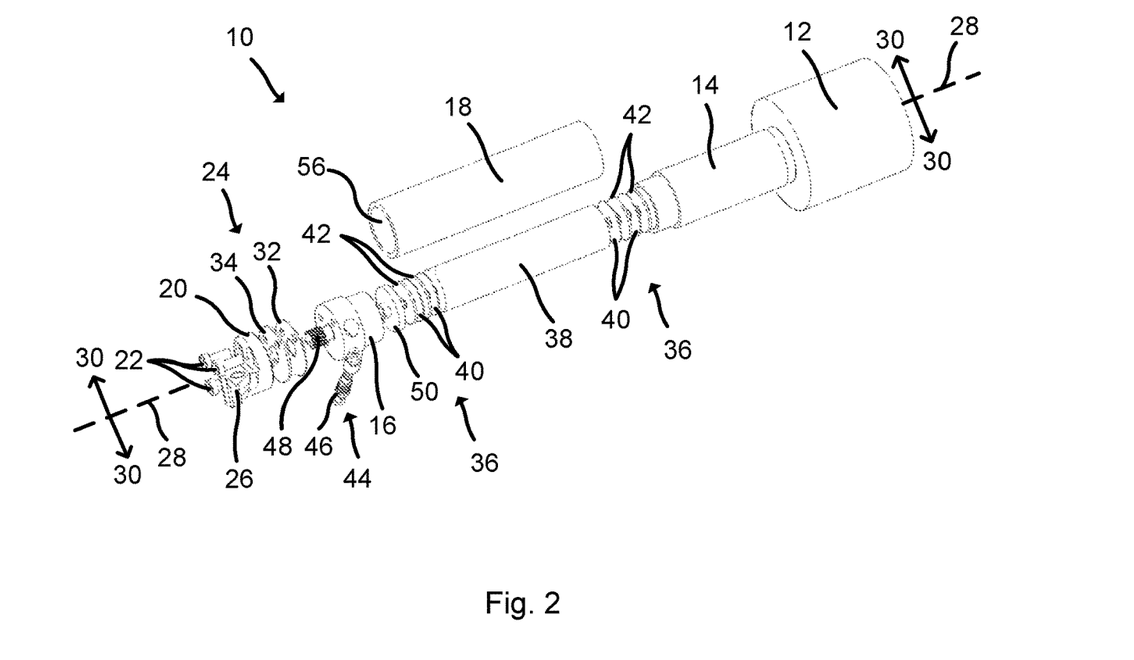
FIG. 2: schematically represents an exploded perspective view of the boring bar assembly in FIG. 1.

FIG. 2 schematically represents an exploded perspective view of the boring bar assembly 10 in FIG. 1. The boring bar assembly 10 further comprises two damping structures 36 for supporting each end of a damping mass 38 provided within a cavity 56 of the boring bar body 18.

Each damping structure 36 comprises a plurality of spring elements 40 of flat appearance. The spring elements 40 of the damping structure 36 constitute a lamellate structure. In this example, the damping structure 36 also comprises the metal plates 42 in the lamellate structure of the damping structure 36. The lamellate structure of the spring elements 40 facilitate the shear motion, i.e. in the radial directions 30, of the damping structure 36.

FIGS. 1 and 2 further show that the boring bar assembly 10 comprises a worm drive 44 having a worm screw 46 and a worm wheel 48, and a compression plate 50, which will be described later.

In prior art solutions, where a thick rubber ring has been compressed, creeping might be initiated and the stiffness be reduced. This will lead to a mismatch of the tuned mass damper frequency to the frequency of the tool.

Due to the flat appearance of each spring element 40 according to the present disclosure, the risk for creeping in the spring elements 40 is reduced. Therefore, the stiffness of the spring elements 40 can be better maintained. As a result, the rotatable assembly 10 has a more reliable operation.

The stiffness of the damping structure 36 in the shear directions (i.e. in the radial directions 30) can be adjusted by adding or removing spring elements 40 to or from the damping structure 36. A higher number of spring elements 40 in the damping structure 36 gives a lower stiffness in the shear direction, and vice versa. The damping structure 36 comprising a stack of spring elements 40 facilitates and makes more accurate the assembly.

With the use of a frequency dependent material for the spring elements 40 i.e. where the elastic modulus of the spring elements 40 changes in dependence of the vibration frequency, a self-tuning effect can be realized. That is, the changed vibration frequency of the spring elements 40 alternates the elastic modulus of the spring elements 40 such that the resonant frequency of the damping mass 38 changes.

By rotating the worm screw 46, the worm wheel 48 moves axially inside the plug member 16 to push the compression plate 50 along the rotational axis 28. By rotating the worm screw 46 in the opposite direction, the worm wheel 48 moves in the opposite direction along the rotational axis 28 (towards the free end of the boring bar assembly 10 where the tool head 20 is located). This rotation may be continued until the worm screw 46 completely disengages from the plug member 16 and further metal plates 42 and/or spring elements 40 can be added to or removed from the damping structure 36.

When a compression force is applied to the damping structure 36, the compression force is essentially translated into an increased contact pressure between the surfaces of the metal plates 42 and the spring elements 40, and not into a changed geometry of the spring elements 40. Tuning of the stiffness of the damping structure 36 (in addition to the self-tuning described in the present disclosure) is primarily realized by alternating the number of spring elements 40 and secondly by adjusting the compression preload from the compression plate 50 on the damping structure 36.

The compression preload on the second damping structure 36 (to the right in FIG. 2) is adjusted by means of the tail locking part 14. The tail locking part 14 also comprises a recess to match with the outer contour of the outermost component of the right (in FIG. 2) damping structure 36, e.g. a metal plate 42.

In this example, the compression plate 50 comprises a hexagonal portion on one end to establish a rotational lock about the rotational axis 28 relative to the plug member 16. Other structures and ways to accomplish a rotational locking between the compression plate 50 and the plug member 16 are of course possible. The compression plate 50 is allowed to move relative to the plug member 16 along the rotational axis 28.

The tooling segment of tuned mass vibration damped tools is still a niche market with high profit margins but low sales volumes. Some disadvantages of prior art tools are the high manufacturing costs due to construction complexity with the requirement of hydraulic sealing and the personal cost when requesting an expert to find the correct tuning and to educate the machine operators to learn the tuning process.

Some prior art documents describe symmetric supporting elements made of rubber or elastomers for supporting a mass. The supporting elements can be compressed to alter their cross section, geometry and/or the contact surface area to tune the stiffness. However, machining tools are usually asymmetric with respect to the rotational axis. Therefore, a correctly tuned resonant frequency of a tuned mass damper for one particular radial direction may result in an erroneously tuned resonant frequency in the other radial directions. Moreover, the machining tools are often used in turbulent operating conditions and may vibrate at a frequency in the range of ±20% of the measured mode frequency when measured under free conditions. That is one of the reasons why tuned mass damper solutions are not so often used on rotating tools, as the vibration frequency is constantly changing.

Tuned mass dampers of the prior art are usually tuned to damp the vibrations of the most resilient mode (i.e. the first vibration mode). Therefore, the higher vibration modes usually constitute the most prominent problem which substantially limits the cutting insert's tool life due to high frequency vibrations (e.g. >1000 Hz) and high acceleration vibrations.

Figure 3A:
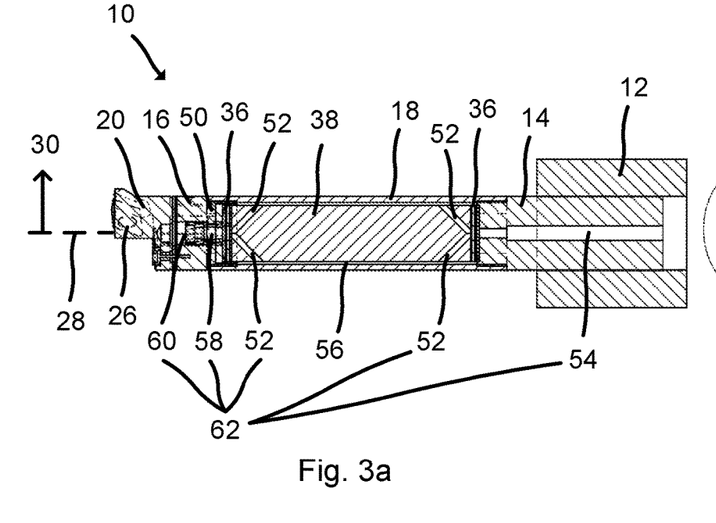
FIG. 3a: schematically represents a cross sectional side view of the boring bar assembly along section A-A in FIG. 1.
Figure 3B:
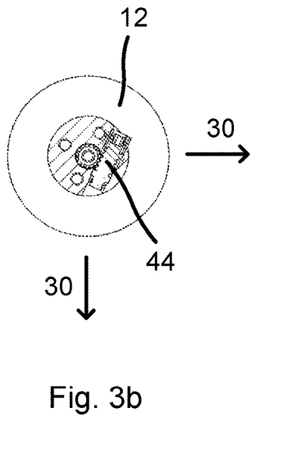
FIG. 3b: schematically represents a cross sectional side view of the boring bar assembly along section B-B in FIG. 1.

FIG. 3a schematically represents a cross sectional side view of the boring bar assembly 10 along section A-A in FIG. 1 and FIG. 3b schematically represents a cross sectional side view of the boring bar assembly 10 along section B-B in FIG. 1

As can be seen in FIG. 3a, a clearance is formed between the damping mass 38 and the boring bar body 18. Cooling channels 52 are provided in the damping mass 38. The cooling channels 52 establish a fluid communication between a cooling channel 54 in the tail locking part 14 and the cavity 56 and between a cooling channel 58 in the compression plate 50 and the cavity 56. The cooling channel 58 in the compression plate 50 is in fluid communication with a cooling channel 60 in the plug member 16 from where coolant can be led to the cutter 26 to be cooled.

The cooling channel 54 of the tail locking part 14, the cooling channels 52 in the damping mass 38, the cooling channel 58 in the compression plate 50 and the cooling channel 60 in the plug member 16 constitute a coolant supply structure 62 for supplying coolant to the tool head 20. In this example, the cooling channels 52 of the damping mass 38 are inclined approximately 45° and are arranged at the respective end portions of the damping mass 38.

Due to the guiding of coolant in the clearance between the damping mass 38 and the boring bar body 18, the coolant can both be used to cool a tool head 20 (and/or the spring elements 40) and serve as a viscous fluid to damp vibrations of the boring bar body 18 and the damping mass 38. The coolant pressure in the cavity 56 may be approximately 6 bar, or less than 6 bar.

Furthermore, by controlling the coolant flow in the coolant supply structure 62, the temperature of the spring elements 40 can be controlled. In case the spring elements 40 comprise a material with temperature dependent elastic modulus, also the resonance frequency of the tuned mass damper (the damping structure 36 and the damping mass 38) can be controlled to match a vibration frequency of the rotatable boring bar 10 by varying the coolant temperature.

Figure 4A:
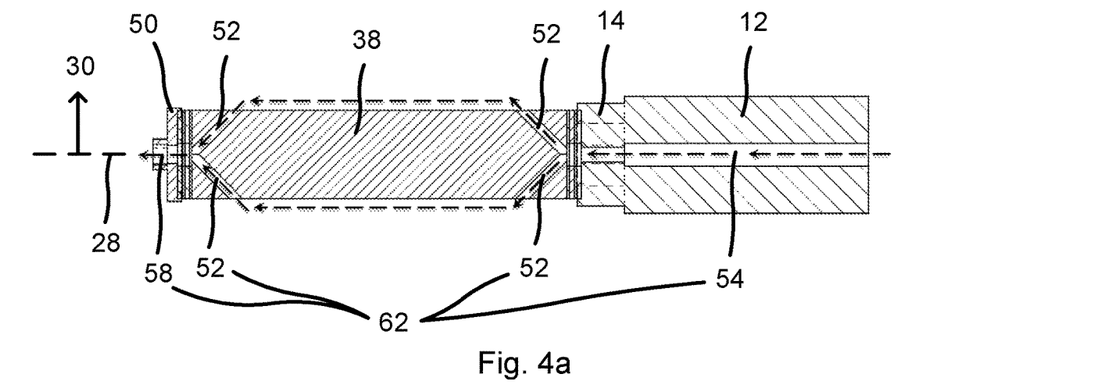
FIG. 4a: schematically represents a partial cross sectional side view of the boring bar assembly in FIG. 1.
Figure 4B:
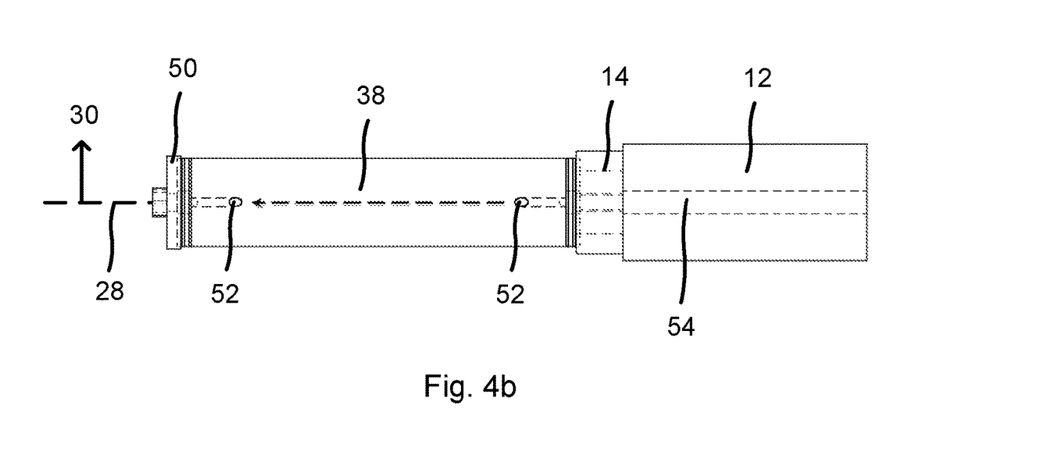
FIG. 4b: schematically represents a partial side view of the boring bar assembly in FIG. 1.
Figure 5A:
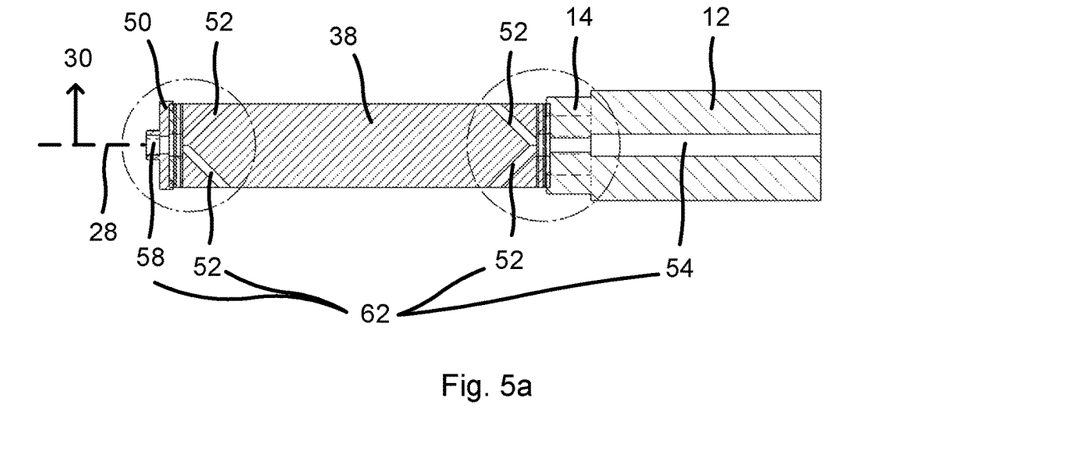
FIG. 5a: schematically represents a partial cross sectional view of the boring bar assembly in FIG. 1.
Figure 5B:
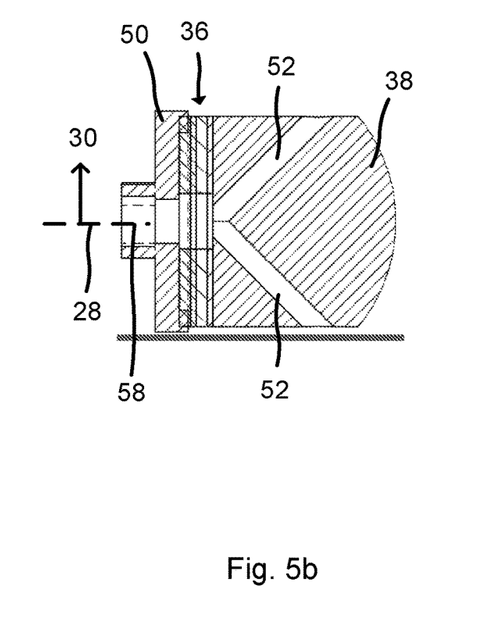
FIG. 5b: schematically represents a partial cross sectional view of the boring bar assembly in FIG. 1.
Figure 5C:
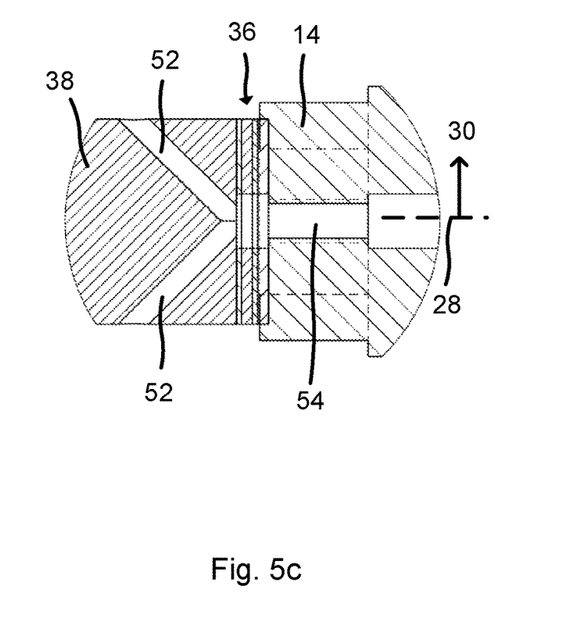
FIG. 5c: schematically represents a partial cross sectional view of the boring bar assembly in FIG. 1.

The configuration of the coolant supply structure 62 is illustrated further in FIGS. 4a to 5c. FIG. 4a schematically represents a partial cross sectional side view of the boring bar assembly 10 in FIG. 1. FIG. 4b schematically represents a partial side view of the boring bar assembly 10 in FIG. 1. FIG. 5a schematically represents a partial cross sectional view of the boring bar assembly 10 in FIG. 1. FIG. 5b schematically represents a partial cross sectional view of the boring bar assembly 10 in FIG. 1. FIG. 5c schematically represents a partial cross sectional view of the boring bar assembly 10 in FIG. 1.

Figure 6A:
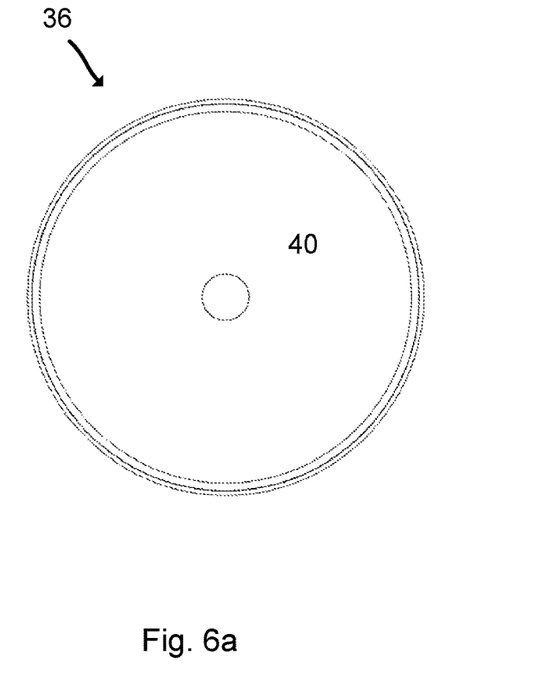
FIG. 6a: schematically represents a front view of a damping structure.
Figure 6B:
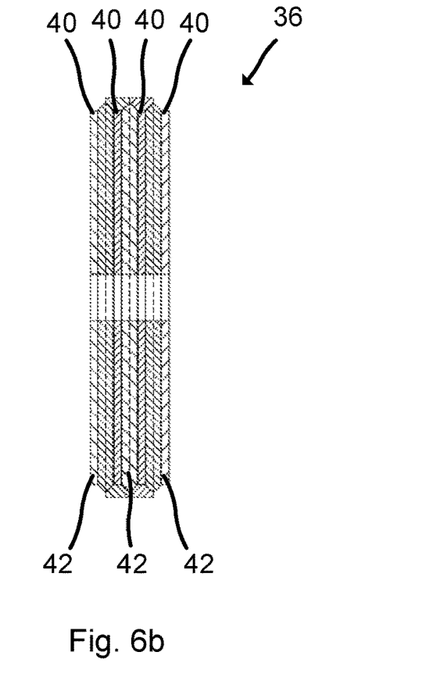
Figure 6C:
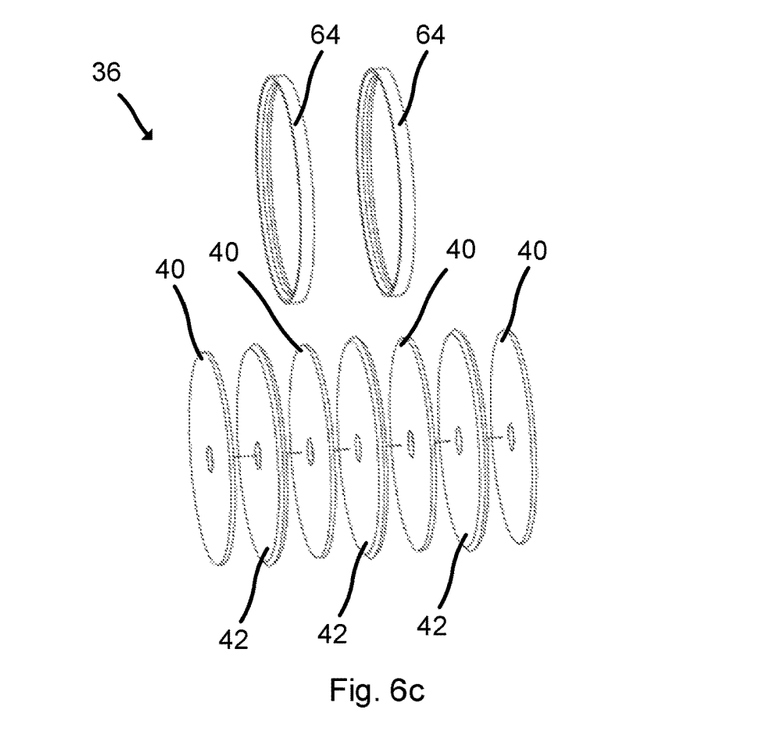
FIG. 6c: schematically represents an exploded perspective view of the damping structure in FIGS. 6a and 6b.

FIG. 6a schematically represents a front view of a damping structure 36, FIG. 6b schematically represents a side view of the damping structure 36 in FIG. 6a and FIG. 6c schematically represents an exploded perspective view of the damping structure 36 in FIGS. 6a and 6b.

In the example in FIGS. 6a to 5c, it can be seen that the damping structure 36 is constituted by a stack of four circular spring elements 40 and three intermediate circular metal plates 42 arranged as a stack. Two retaining rings 64 are shown in FIG. 6c which may be used to keep the spring elements 40 and the metal plates 42 together. The damping structure 36 according to FIGS. 6a to 6c may be used with a boring bar assembly 10 that is symmetric with respect to the rotational axis 28.

However, many rotating structures are usually asymmetric about the rotational axis and thereby exert different first mode vibration frequencies over different radial directions. Machining tools, for example, have varied first mode vibration frequencies depending on the directions in the plane perpendicular to the rotational axis of the machining tool. In prior art solutions where an asymmetric machining tool is damped by using a severely compressed elastomer or rubber piece, the resonant frequency of the tuned mass damper in the radial directions is the same. Therefore, the tuned mass damper is only optimized for one direction, whereas other directions are not optimized. As a consequence, the tuned mass damper might add vibrations to the machining tool instead of cancelling the vibrations.

Figure 7:
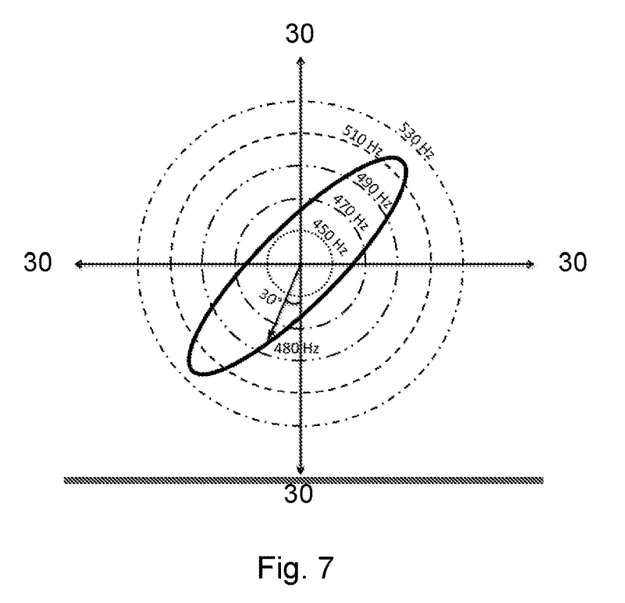
FIG. 7: is a diagram showing an example of a varying vibration mode frequency of the boring bar assembly in radial directions.

FIG. 7 is a diagram showing an example of a varying vibration mode frequency of the boring bar assembly 10 in the radial directions 30, i.e. in a plane perpendicular to the rotational axis 28 of the boring bar assembly 10. In the example of FIG. 7, it can be seen that at a direction of 30 degrees relative to the downwardly pointing radial direction 30, the vibration frequency of the boring bar assembly 10 is 480 Hz while the highest vibration frequency of the boring bar assembly 10 is close to 520 Hz.

A circular damping structure (as shown in FIGS. 6a to 6c) will provide the same resonant frequency of the damping mass in all radial directions. Such damping structure will therefore only cancel vibrations of an asymmetric machining tool in some radial directions. In other radial directions, the damping structure will give a poor damping and might even add vibrations to the machining tool. However, if the machining tool is symmetric about its rotational axis, a symmetric damping structure may be used.

Figure 8A:
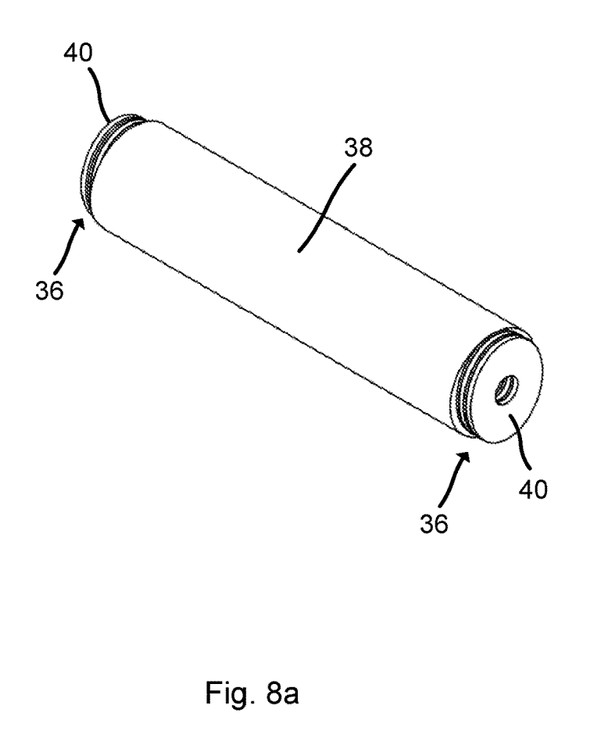
FIG. 8a: schematically represents a perspective view of a damping mass and two damping structures.
Figure 8B:
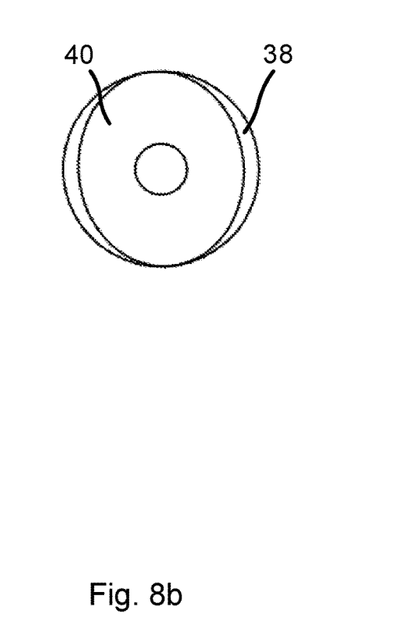

FIG. 8a schematically represents a perspective view a damping mass 38 and two damping structures 36 comprising spring elements 40. FIG. 8b schematically represents a front view of the damping mass 38 in FIG. 8a.

In FIGS. 8a and 8b, each damping structure 36 comprises a stack of elliptic spring elements 40. With this damping structure 36, the resonant frequencies of the damping mass 38 varies in different radial directions 30. Thereby, vibrations in an asymmetrical rotatable assembly 10 (asymmetric with respect to the rotational axis 28) can be cancelled.

The elliptic shape in FIGS. 8a and 8b is merely one example of a shape having varying extension in the radial directions 30. Alternative shapes include for example triangular and rectangular shapes.

Figure 9A:
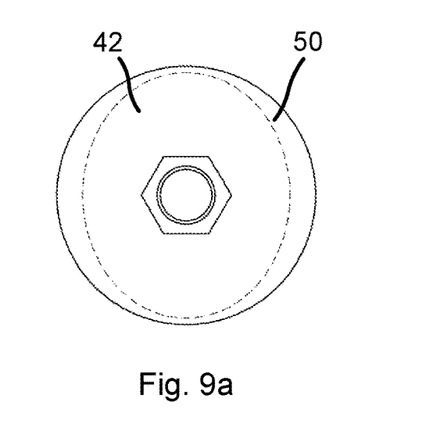
FIG. 9a: schematically represents a front view of a compression plate and a metal plate.
Figure 9B:
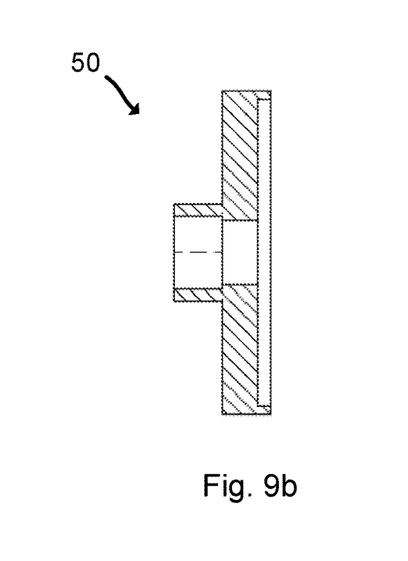
Figure 9C:
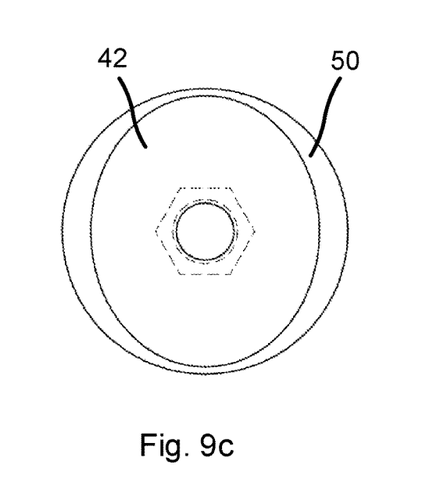
FIG. 9c: schematically represents a rear view of the compression plate and the metal plate in FIGS. 9a and 9b.

FIG. 9a schematically represents a front view of a compression plate 50 and a metal plate 42. FIG. 9b schematically represents a cross sectional side view of the compression plate 50 and the metal plate 42 in FIG. 9a. FIG. 9c schematically represents a rear view of the compression plate 50 and the metal plate 42 in FIGS. 9a and 9b;

In FIGS. 9a to 9c, it can be seen that the compression plate 50 comprises an elliptical recess at its end face opposite to the hexagonal portion. The elliptical recess is configured to receive the outermost elliptic metal plate 42 of the damping structure 36.

Figure 10:
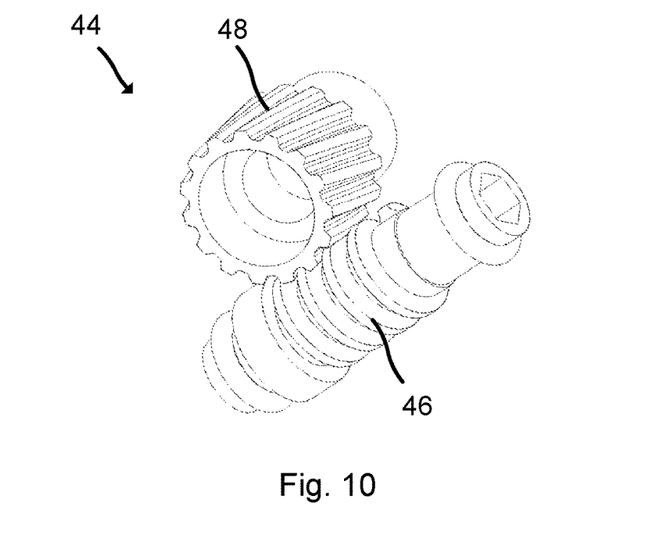
FIG. 10: schematically represents a perspective view of a worm drive.

FIG. 10 schematically represents a perspective view of a worm drive 44. The worm drive 44 may utilize gears having a lead angle having a tangential value less than a coefficient of friction between the contacting surfaces with or without lubricants. The worm drive 44 constitutes a compact arrangement for supplying a compression preload to the spring elements 40. The worm drive 44 also provides an increased torque transmission ratio and a self-locking effect, i.e. the worm drive 44 resists drifting of the compression preload. A scale may be provided to indicate the correspondence between compression preload on the damping structure 36 and number of turns of the worm screw 46.

Figure 11:
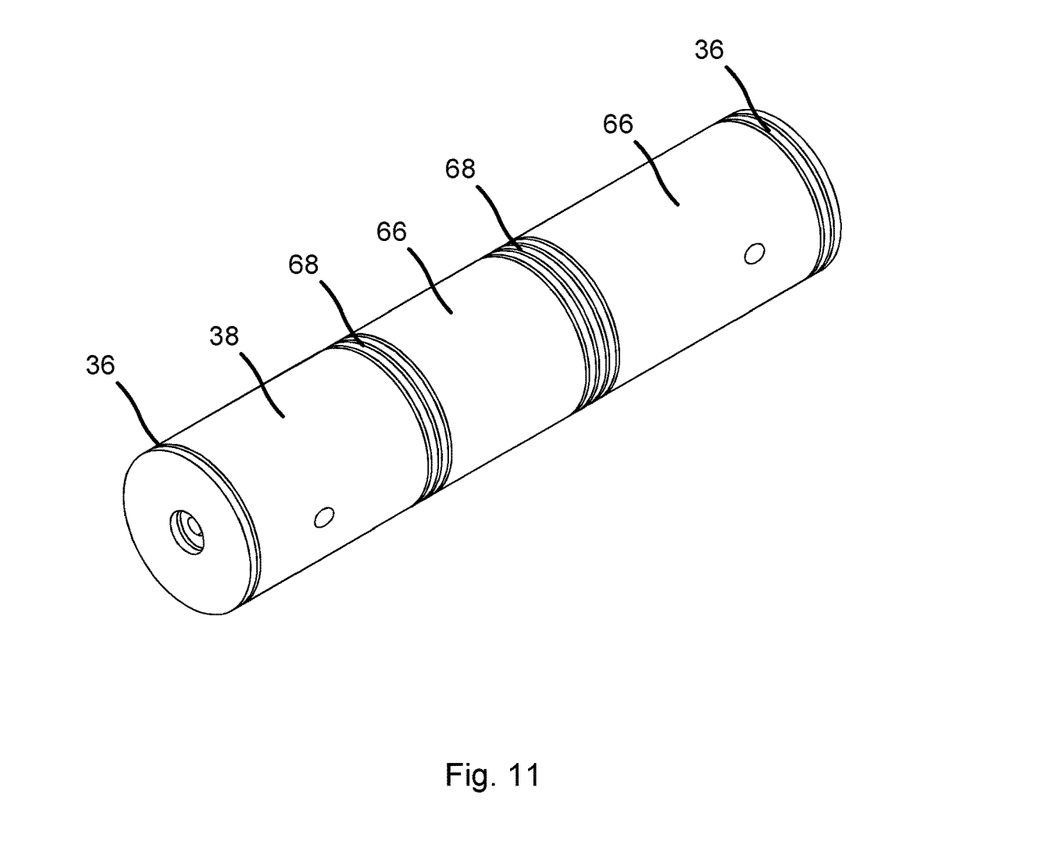
FIG. 11: schematically represents a perspective view of a plurality of damping masses and a plurality of damping structures arranged in an alternating manner.

FIG. 11 schematically represents a perspective view of a plurality of damping masses 38, 66 and a plurality of damping structures 36, 68 arranged in an alternating manner. Each of the three damping masses 38, 66 in FIG. 11 has a unique weight. The weights may be selected to cancel vibrations of the rotatable assembly 10 not only in the first vibration mode, but also in higher vibration modes. Thus, when employing several damping masses 38, 66 connected with damping structures 36, 24, the damping performance of the boring bar assembly 10 can be improved over a wider frequency band.

Figure 12:
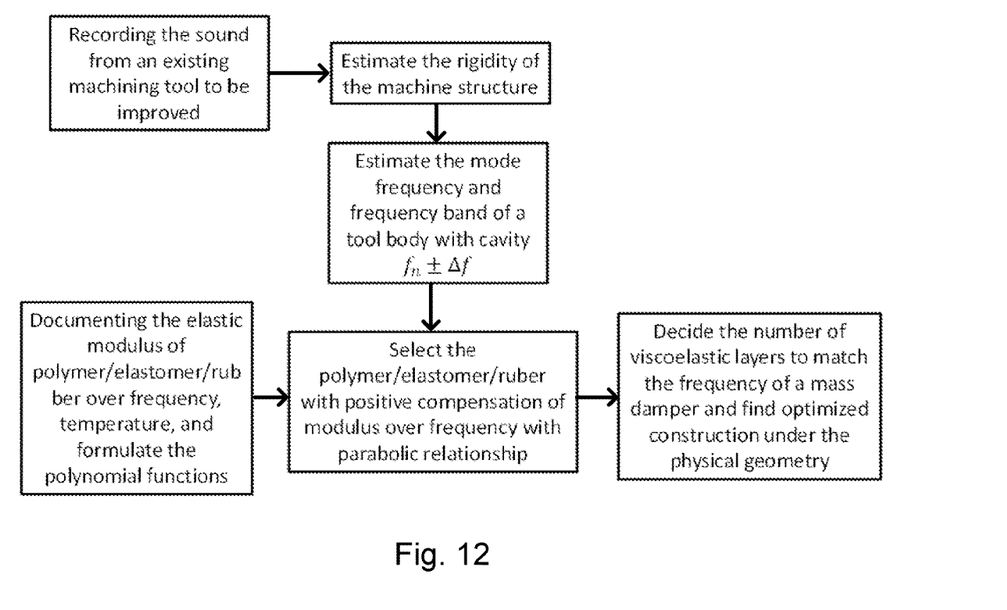
FIG. 12: is a diagram illustrating a method of selecting the most appropriate material for the spring elements and number of spring elements in the damping structure.

FIG. 12 is a diagram illustrating a method of selecting the most appropriate material for the spring elements and number of spring elements in the damping structures.

Figure 13:
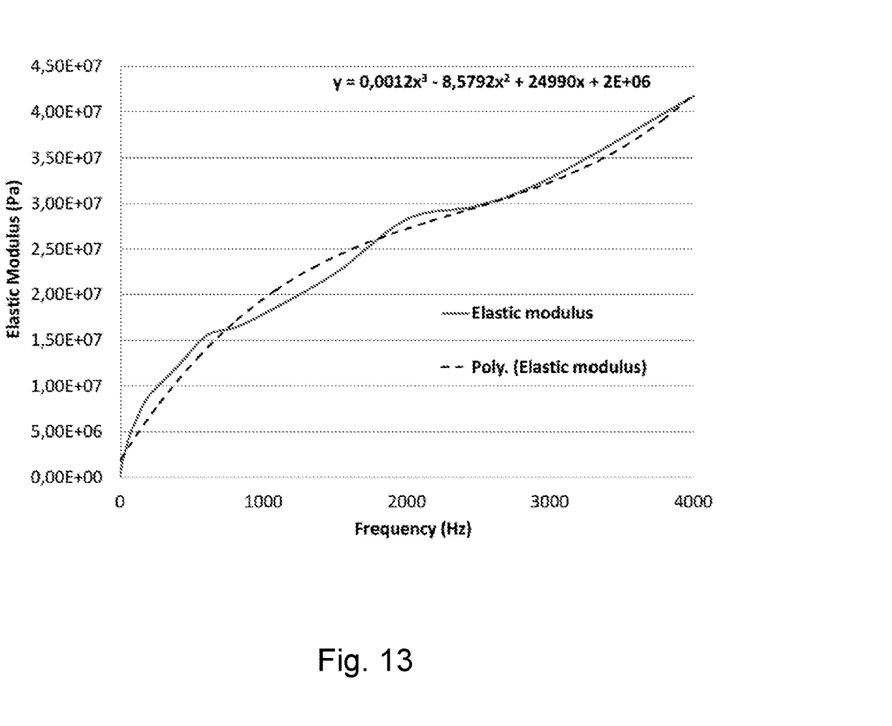
FIG. 13: is a diagram showing the elastic modulus of a polymer with respect to frequency.

FIG. 13 is a diagram showing the elastic modulus of a 3M® 112' viscoelastic polymer with respect to frequency.

The relationship between the elastic modulus and frequency can be represented by high order polynomials. When the polynomial relationship between the elastic modulus and the frequency is higher than 2 and conforms to a mathematic condition, there exists a frequency at which the increase/decrease of the vibration frequency of the boring bar assembly is compensated by an increased/decreased stiffness of the damping structure due to the frequency dependent elastic modulus of the spring elements.

One approach to represent the relationship between the elastic modulus and frequency as in FIG. 13 is to use the polynomial function:

$$E(f) = \ldots Df^3 + Cf^2 + Bf + A$$

Assume that the estimated vibration frequency is $f_n$ and the estimated variation of frequency is $\Delta f_n$, the resonant frequency of the damping mass is proportional to the square root of the elastic modulus of the viscoelastic material of the spring element and can be expressed as:

$$f_m = \frac{1}{2\pi}\sqrt{\frac{\bar{k}}{m}E(f)} \tag{1}$$

where $\bar{k}$ is the stiffness factor determined by the geometry and construction of the spring element. m is the mass of the damping mass. At the estimated vibration frequency $f_n$, the resonant frequency of the damping mass satisfies that:

$$f_m = \frac{1}{2\pi}\sqrt{\frac{\bar{k}}{m}E(f_n)} = f_n \tag{2}$$

The change of $f_m$ expressed as $\Delta f_m$ can be estimated as:

$$\Delta f_m = \frac{1}{2\pi}\sqrt{\frac{\bar{k}}{m}E(f_n + \Delta f_n)} - \frac{1}{2\pi}\sqrt{\frac{\bar{k}}{m}E(f_n)} \tag{3}$$
$$= \frac{1}{2\pi}\sqrt{\frac{\bar{k}}{m}}\left(\sqrt{E(f_n + \Delta f_n)} - \sqrt{E(f_n)}\right)$$
$$= \Delta f_n$$

$$\frac{1}{2\pi}\sqrt{\frac{\bar{k}}{m}} \text{ with } \frac{f_n}{\sqrt{E(f_n)}},$$

After replacing the term the equation (3) can be rewritten as:

$$\sqrt{\frac{E(f_n + \Delta f_n)}{E(f_n)}} = 1 + \frac{\Delta f_n}{f_n} \tag{4}$$

$f_n$ can be expressed as proportional to $f_n$ and it can be rewritten as $\Delta f_n = \alpha f_n$ and the equation can be written as:

$$\sqrt{\frac{E(f_n + \alpha f_n)}{E(f_n)}} = 1 + \alpha \tag{5}$$

It is then a mathematic problem to find the frequency at which the frequency change of $\Delta f_n$ of the boring bar assembly induces the same amount of frequency change $\Delta f_m$ on the damping mass to match the two frequencies again.

For example, if the estimated frequency change is ±5%, the solution of $f_n$ in equation (5) is approximately 4530 Hz while using the example material in FIG. 13 to compose the spring element. At 4530 Hz and if the boring bar assembly frequency is changed by 226 Hz (5%), the example viscoelastic polymer will alter its elastic modulus to change the resonant frequency of the damping mass which will then match the changed vibration frequency of the boring bar assembly 10. If the boring bar assembly is most likely to vibrate at other frequency, it is then recommended to find the most suitable resilient material to compose the spring element to its self-tuning effect.

Figure 14A:
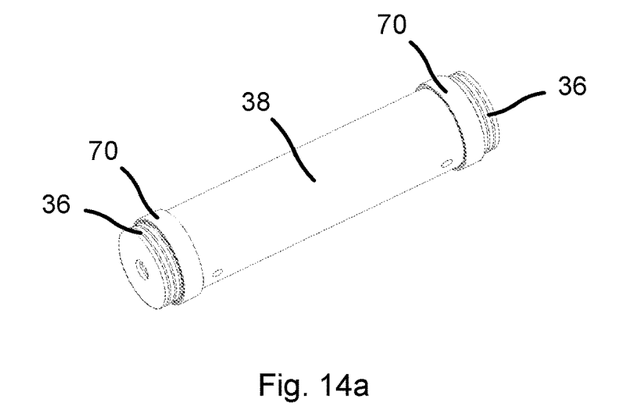
FIG. 14a: schematically represents a perspective view of a variant of a damping mass supported by two damping structures and two auxiliary supporting structures.
Figure 14B:
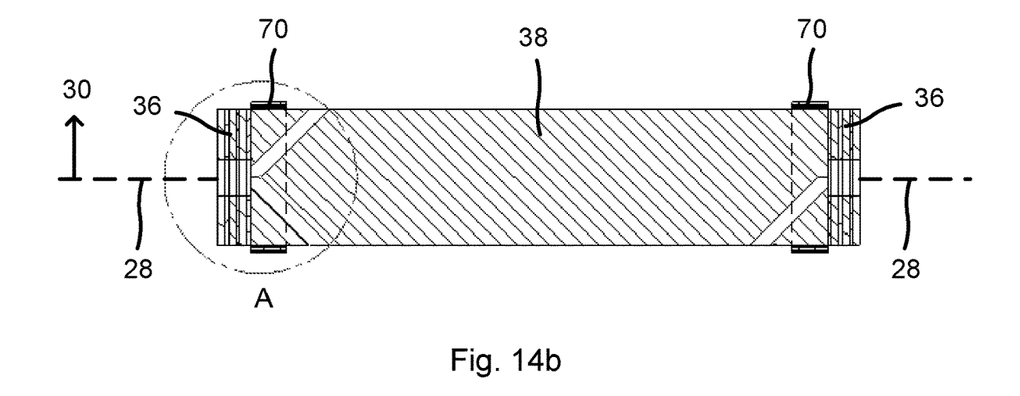
Figure 14C:
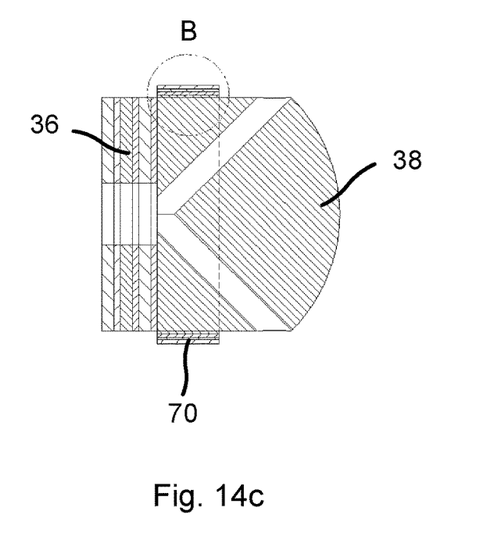
FIG. 14c: schematically represents section A in FIG. 14b.
Figure 14D:
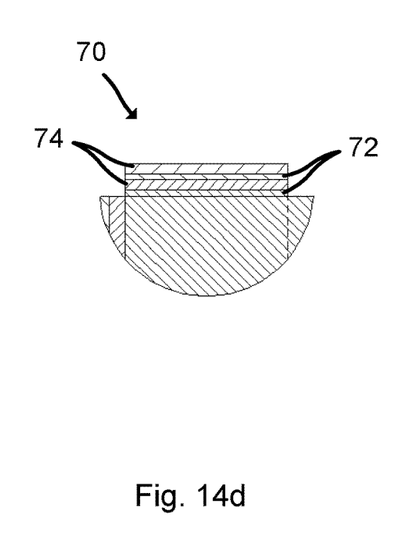
FIG. 14d: schematically represents section B in FIG. 14c.

FIG. 14a schematically represents a perspective view of a variant of a damping mass 38 supported by two damping structures 36 as previously described. However, in FIG. 14a, the damping mass 38 is not only supported by the damping structures 36, but also by two auxiliary supporting structures 70. In the variant of FIGS. 14a to 14d, each auxiliary supporting structure 70 comprises layers of resilient material 72 and layers of metallic material 74.

The layers of resilient material 72 and the layers of metallic material 74 are arranged in an alternating manner in the radial directions 30. The layers of resilient material 72 and the layers of metallic material 74 are thus substantially parallel with the rotational axis 28 of the damping mass 38.

Figure 15A:
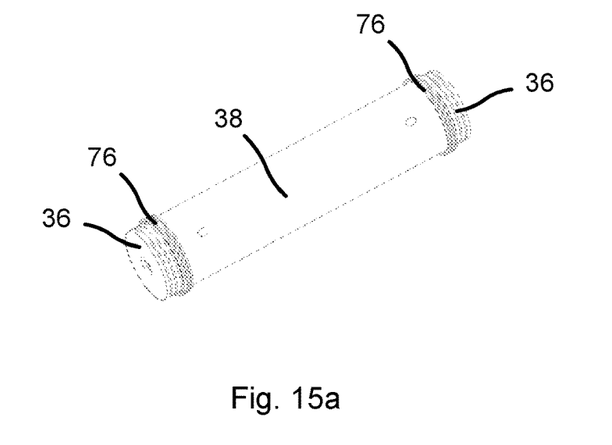
FIG. 15a: schematically represents a perspective view of a further variant of a damping mass supported by two damping structures and two auxiliary supporting structures.
Figure 15B:
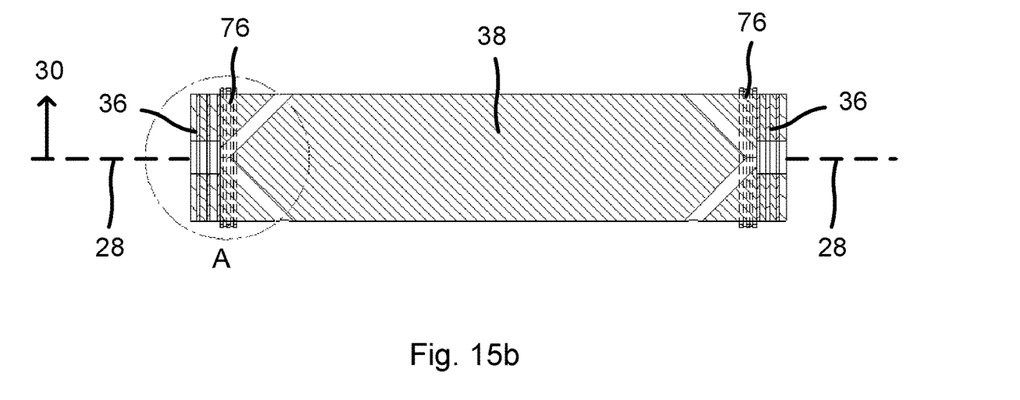
Figure 15C:
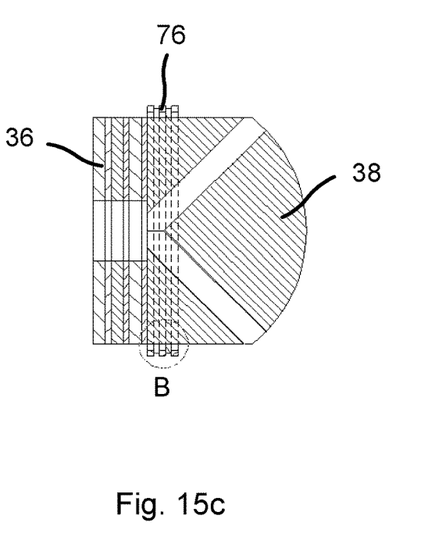
FIG. 15c: schematically represents section A in FIG. 15b.
Figure 15D:
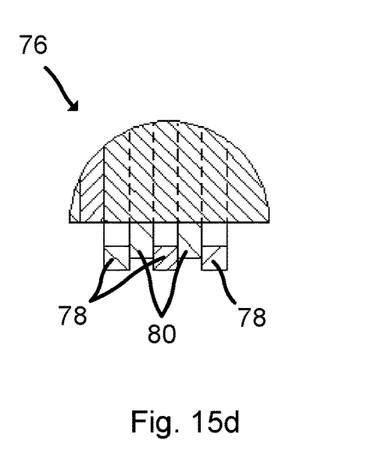
FIG. 15d: schematically represents section B in FIG. 15c.

FIG. 15a schematically represents a perspective view of a further variant of a damping mass 38 supported by two damping structures 36 as previously described and also by two auxiliary supporting structures 76. In FIGS. 15a to 15d, the auxiliary supporting structures 76 comprises layers of resilient material 78 and layers of metallic material 80.

The layers of resilient material 78 and the layers of metallic material 80 are arranged in an alternating manner along the rotational axis 28 of the damping mass 38. The layers of resilient material 78 and the layers of metallic material 80 are thus substantially parallel with the radial directions 30.

For both the variants in FIGS. 14a to 14d and FIGS. 15a to 15d, the layers of resilient material 72, 78 separate the damping mass 38 from the main body 18. Particularly in the variant shown in FIGS. 14a to 14d, this is achieved by having a small mismatch between the layers of metallic material 74 and layers of resilient material 72. The damping mass 38 is then only in physical contact with the layers of resilient material 72.

In a further variant, the arrangement of the layers of resilient material 78 and the layers of metallic material 80 in FIGS. 15a to 15d may be changed. In a further variant, the auxiliary support structures 70, 76 are made of ring elements. Each ring element may comprise one layer of resilient material and one layer of metallic material. These ring elements may have one layer of resilient material and one layer of metallic material. These ring elements may have varying internal and external diameter and may be assembled to form a stack to support the damping mass 38. These assemblies are particularly beneficial when vibration mode shapes other than bending dominates. While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A rotatable assembly having one end adapted to be secured to a rotatable support for rotating the rotatable assembly about a rotational axis, the rotatable assembly comprising:
   a main body having a cavity;
   a damping mass arranged within the cavity and movable in radial directions, substantially perpendicular to the rotational axis, relative to the main body;
   a damping structure arranged to support the damping mass relative to the main body and arranged to damp vibrational movements of the damping mass relative to the main body in the radial directions;
   wherein the damping structure comprises a plurality of spring elements;
   wherein each spring element has a flat appearance;
   wherein the spring elements comprise a material having a frequency dependent elastic modulus; and
   wherein the rotatable assembly is configured such that when a vibration frequency of the rotatable assembly is changed 5% from 4530 Hz, the elastic modulus of the spring elements will automatically change to match the changed vibration frequency of the rotatable assembly without changing a compression preload on the damping structure.

2. The rotatable assembly according to claim 1, wherein a width of each spring element in a radial direction is at least 30 times, a thickness of the spring element along the rotational axis.

3. The rotatable assembly according to claim 1, wherein one or more of the plurality of spring elements has a varying extension in the radial directions.

4. The rotatable assembly according to claim 3, wherein the one or more of the plurality of spring elements has an elliptical, triangular or polygonal appearance, as seen along the rotational axis.

5. The rotatable assembly according to claim 1, wherein the damping structure has different stiffness in different radial directions.

6. The rotatable assembly according to claim 1, wherein the rotatable assembly is configured such that at least one spring element can be added to, or removed from, the damping structure in order to decrease or increase, respectively, the stiffness of the damping structure in the radial directions.

7. The rotatable assembly according to claim 1, wherein the damping structure comprises a plurality of metal plates, wherein the metal plates and the spring elements are arranged in an alternating manner.

8. The rotatable assembly according to claim 1, further comprising a clamping mechanism arranged to compress and uncompress the damping structure along the rotational axis.

9. The rotatable assembly according to claim 8, wherein the clamping mechanism comprises a worm drive.

10. The rotatable assembly according to claim 1, further comprising, in addition to the damping mass, at least one additional damping mass, wherein each damping mass has a unique weight.

11. The rotatable assembly according to claim 10, further comprising, in addition to the damping structure, at least one additional damping structure, wherein the damping masses and the damping structures are alternatingly arranged.

12. The assembly according to claim 1, wherein the rotatable assembly is a machining bar assembly and the main body is a machining bar body.

13. The rotatable assembly according to claim 1, wherein the spring elements comprise, or are constituted by, a viscoelastic material, and wherein the resonance frequency of the damping mass is proportional to the square root of the elastic modulus of the material of the spring elements.

14. The rotatable assembly according to claim 1, wherein the resonance frequency of the damping mass is expressed as:

$$f_m = \frac{1}{2\pi}\sqrt{\frac{\overline{k}}{m}E(f)}$$

where $\overline{k}$ is the stiffness factor determined by the geometry and construction of the spring elements, m is the mass of the damping mass, E is the elastic modulus of the spring elements and f is the vibration frequency of the rotatable assembly.

15. The rotatable assembly according to claim 1, wherein a width of each spring element in a radial direction is at least 50 times a thickness of the spring element along the rotational axis.

16. The rotatable assembly according to claim 1, wherein a width of each spring element in a radial direction is at least 100 times a thickness of the spring element along the rotational axis.

17. The rotatable assembly according to claim 1, further comprising at least one auxiliary supporting structure arranged to separate the damping mass and the main body, wherein each auxiliary supporting structure comprises layers of resilient material and layers of metallic material alternatingly arranged along the rotational axis or in the radial directions.

18. A rotatable assembly having one end adapted to be secured to a rotatable support for rotating the rotatable assembly about a rotational axis, the rotatable assembly comprising:
 a main body having a cavity;
 a damping mass arranged within the cavity and movable in radial directions, substantially perpendicular to the rotational axis, relative to the main body;
 a damping structure arranged to support the damping mass relative to the main body and arranged to damp vibrational movements of the damping mass relative to the main body in the radial directions; and
 at least one auxiliary supporting structure arranged to separate the damping mass and the main body, wherein each auxiliary supporting structure comprises layers of resilient material and layers of metallic material alternatingly arranged along the rotational axis or in the radial directions;
 wherein the damping structure comprises a plurality of spring elements;
 wherein each spring element has a flat appearance;
 wherein the spring elements comprise a material having a frequency dependent elastic modulus; and
 wherein the rotatable assembly is configured such that when a vibration frequency of the rotatable assembly is changed 5% from 4530 Hz, the elastic modulus of the spring elements will change to match the changed vibration frequency of the rotatable assembly.

19. A rotatable assembly having one end adapted to be secured to a rotatable support for rotating the rotatable assembly about a rotational axis, the rotatable assembly comprising:
 a main body having a cavity;
 a damping mass arranged within the cavity and movable in radial directions, substantially perpendicular to the rotational axis, relative to the main body;
 a damping structure arranged to support the damping mass relative to the main body and arranged to damp vibrational movements of the damping mass relative to the main body in the radial directions; and
 at least one auxiliary supporting structure arranged to separate the damping mass and the main body,
 wherein each auxiliary supporting structure comprises layers of resilient material and layers of metallic material alternatingly arranged along the rotational axis or in the radial directions,
 wherein the damping structure comprises a plurality of spring elements, and
 wherein each spring element has a flat appearance.

* * * * *